STATIC OVERLOAD RELAY MEANS FOR USE IN CIRCUIT BREAKERS AND HAVING INVERSE TIME CURRENT CHARACTERISTICS

Filed Feb. 19, 1965

BY

OSTROLENK, FABER, GERB & SOFFEN
ATTORNEYS

United States Patent Office 3,339,114
Patented Aug. 29, 1967

3,339,114

STATIC OVERLOAD RELAY MEANS FOR USE IN CIRCUIT BREAKERS AND HAVING INVERSE TIME CURRENT CHARACTERISTICS

T R. Kelley, Audubon, and J W. Lipnitz, Cherry Hill, N.J., assignors to I-T-E Circuit Breaker Company, Philadelphia, Pa., a corporation of Pennsylvania Filed Feb. 19, 1965, Ser. No. 434,049
8 Claims. (Cl. 317—36)

The instant invention relates to circuit protective means and more particularly to current sensing means having an inverse time characteristic which simulates heating in a current carrying conductor in order to operate a circuit breaker protective means so as to prevent over-heating of the current carrying conductor due to conditions of either light overload or severe short circuit currents within the conductor.

The instant invention provides solid state means for actuating a circuit breaker trip coil with the time elapsed before actuation being inversely proportional to the power supplied from the source to the current carrying conductor being protected. The solid state actuating means is further designed so as to be immediately reset for a full repeat cycle immediately upon occurrence of the trip operation. The only power required for the circuitry is obtained from the sampling voltage inductively derived from the current carrying conductor being protected.

Power sources and the loads on the line which they feed must be adequately protected on overload conditions. The nature of the protection must be such that the time to trip the circuit breaker protecting such a power network is inversely proportional to the degree of overload. While response must be inversely proportional to the power, rapid response to small degrees of overload is undesirable. To achieve a tripping operation upon small degrees of overload after a relatively long delay, without producing prohibitively high circuit parameters on a short circuit current, the instant invention utilizes the energy stored in the basic time-element capacitor to provide the majority of the current utilized to energize a trip coil.

The inverse time-element characteristic can be adjusted to allow for the increased dissipation of heat from a load (such as a motor, for example) as it becomes overheated, thus enabling adequate protection with minimum differential, while in addition thereto, to avoid accidental tripping of the circuit protective device for a circuit breaker.

The instant invention includes means for generating a charging current, I, to a time-element capacitor, which current varies in magnitude in relation to the voltage developed across current transformer means such that the current developed, $I^2$, is proportional to a voltage V across the current transformer means.

The charging current I flows into the timing capacitor until the voltage across the capacitor reaches a predetermined level which represents the desired current-time relationship. At this level the charge on the capacitor is applied to the trip coil means to actuate a circuit breaker. The current flow will continue from the capacitor element until it has fully discharged its stored energy and is ready to begin another complete time-current cycle.

Additional means are provided which modify the time-current cycle to take into account the increased power which can be dissipated in the load as a result of the greater thermal differential of the overloaded element. Since the invention is exclusively comprised of all static elements, its operation is smooth, trouble-free, extremely reliable and is substantially unaffected by dirt, mechanical wear, mechanical inertia and the effects of gravity upon electromechanical devices presently in use.

It is therefore one object of the instant invention to provide novel means for protecting current carrying conductors against overload conditions.

Another object of the instant invention is to provide novel sensing means for protecting current carrying conductors against overload conditions employing inverse time delay means designed to simulate temperature build-up in current carrying conductors.

Another object of the instant invention is to provide novel sensing means for protecting current carrying conductors against overload conditions and employing a capacitor time-element which is arranged to supply substantially all of the tripping energy in addition to its time delay characteristic.

Still another object of the instant invention is to provide novel sensing means for protecting current carrying conductors against overload conditions wherein the current supplied to operate the sensing circuit and its trip coil is taken exclusively from the current carrying conductor being protected without any necessity for providing any local power source for operation of the circuit.

These and other objects of the instant invention will become apparent when reading the accompanying description and drawings in which.

Figure 1:
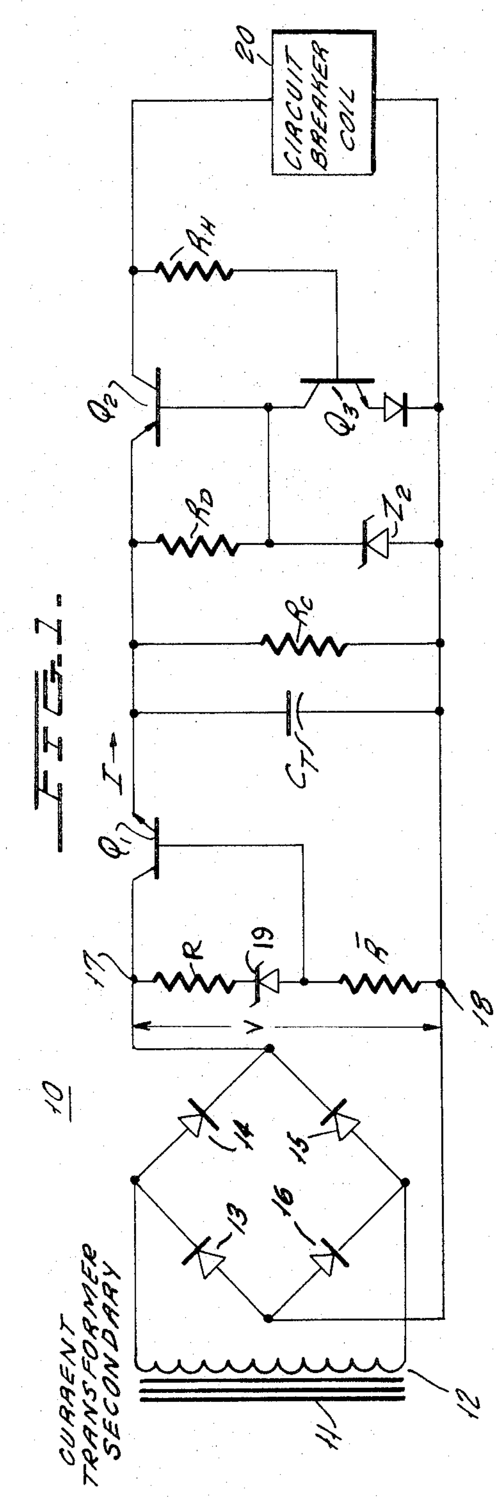
FIGURE 1 is a schematic diagram showing one embodiment of the instant invention.

Referring now to the drawings, FIGURE 1 shows an inverse time element circuit, 10, for protecting a current carrying conductor 11 which comprises the input winding, or primary winding, of a current transformer 12. The secondary winding of current transformer 12 is connected across the full-wave rectifier means comprised of diodes 13–16 which act to full-wave rectify the output taken from the transformer secondary, which output voltage, V, appears across the terminals 17 and 18.

The charging current I for the inverse time element circuit 10 is established by the variation in voltage drop across the resistive elements R and $\overline{R}$ as a result of the current flowing through these impedance elements. $\overline{R}$ is a non-linear resistance element such as a Varistor, where the characteristics of the Varistor take the form $I=KV^n$. The zener diode 19, connected in series with resistive elements R and $\overline{R}$, is provided for the purpose of determining the minimum voltage from 17 to 18 which will start the charging (or timing cycle). Since this voltage is a function of the primary current through current transformer 12, it establishes a minimum current at which the protective device will start to time out.

Due to the characteristics of the resistive element $\overline{R}$, the voltage across this element will vary inversely with the current through the element in accordance with the equation given above and controls the charging current through the transistor $Q_1$, whose emitter electrode is connected to the timing capacitor $C_T$. This charging current, I, flows into the capacitor $C_T$ causing it to charge. The timing capacitor $C_T$ is discharged through the transistor $Q_2$. The time of start of discharge is controlled by the series connected resistor and zener diode elements $R_D$ and $Z_2$, respectively. The zener diode $Z_2$ is chosen to fire at the value of capacitor voltage which represents the desired current-time relationship. Until such time as the zener diode $Z_2$ fires, no current flows through resistor $R_D$ and the resultant base-emitter voltage of transistor $Q_2$ keeps the transistor in the cut-off state. Once the zener diode $Z_2$ fires, the voltage drop across resistor $R_D$ turns on transistor $Q_2$. The collector voltage of transistor $Q_2$ rises and the resultant current provided to the base electrode of transistor $Q_3$ through resistive element $R_H$ insures the continued current flow from the time element capacitor $C_T$ through the trip coil element 20 until capacitor $C_T$ is fully discharged. Thus, the system is automatically reset to be ready for another complete current-time cycle.

The circuit breaker trip coil 20, when fully energized, operates to provide the automatic tripping of a circuit breaker (not shown) which may be coupled in any well known fashion so as to isolate the current carrying conductor 11 from its power source (not shown).

Figure 2:
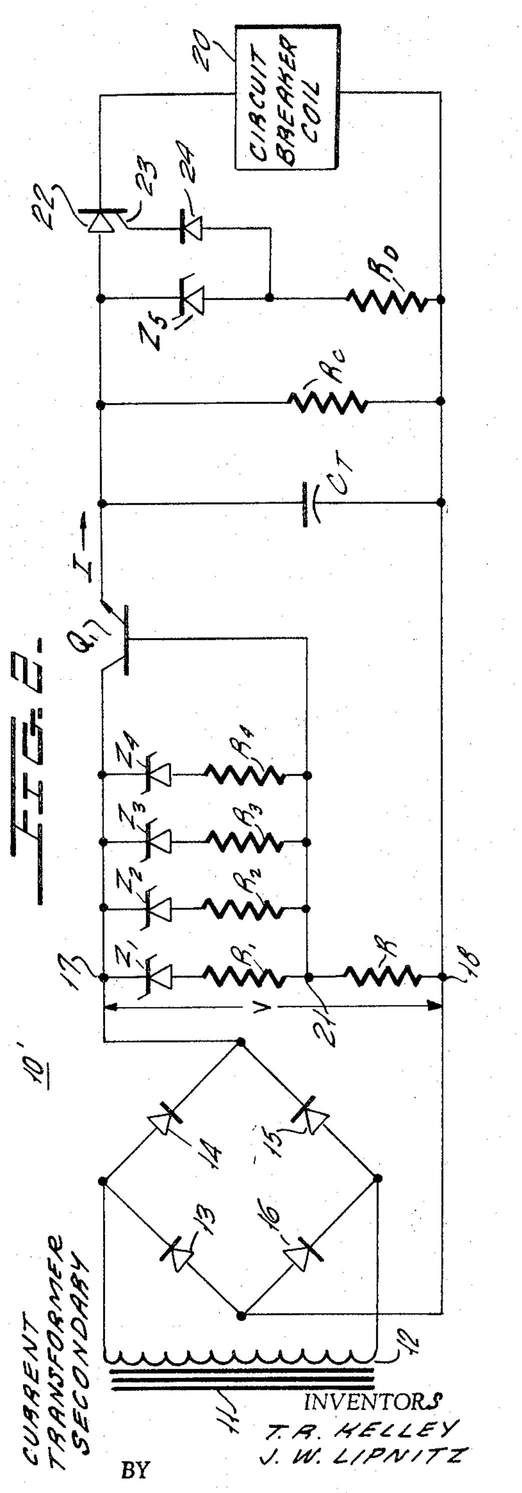
FIGURE 2 is a schematic diagram showing an alternative embodiment for the instant invention.

The alternative embodiment 10', shown in FIGURE 2, provides an alternative arrangement as a substitute for the Varistor element $\overline{R}$ in the form of the four parallel branches comprised of the series connected resistor and zener diode elements $R_1$–$Z_1$ through $R_4$–$Z_4$, respectively. The charging current I, established through the series transistor $Q_1$ is determined by the variation in current through the resistive element R connected in common at terminal 21 with the four parallel branches mentioned above. The current through resistive element R is modified by the use of the zener diodes $Z_1$–$Z_4$ where the firing of each zener diode occurs at successively higher voltage levels. This effectively places resistors $R_1$–$R_4$ in parallel as each of the zener diodes fire, resulting in a non-linear change in the voltage across the resistive element R in relation to the voltage across the secondary of the current transformer 12. The non-linear relationship simulates that attained by the Varistor element previously described.

In the embodiment 10' the capacitor $C_T$ charges in the same manner as previously described and its discharge is controlled by means of the branch circuit comprised of the series connected resistor and zener diode elements $R_D$ and $D_5$, respectively. At the appropriate time when the zener diode $Z_5$ fires, a positive voltage is supplied to the gate 23 of silicon controlled rectifier 22 causing it to be driven into conduction. The silicon controlled rectifier 22 continues to conduct until its anode voltage drops below conduction level (which is normally less than one volt), at which time the circuit will automatically reset. Conduction of the silicon controlled rectifier takes place through the circuit breaker trip coil 20 which, in turn, again operates to trip any suitable circuit breaker device (not shown) for the purpose of isolating the current carrying conductor 11 being protected from its power source (not shown). Diode 24 is employed for the purpose of establishing the polarity of operation of the silicon controlled rectifier 22.

In both embodiments, 10 and 10', of FIGURES 1 and 2 respectively, the capacitor $C_T$ is chosen to assure that the energy charge developed across its terminals is sufficient when connected to the trip coil 20 to trip the breaker open. The capacitor is selected for the voltage and capacity rating which represents an energy charge sufficient to move the actuator in the trip coil solenoid over the distance required to open the circuit breaker contacts.

A properly selected resistor $R_C$, connected across the capacitive element and shown in both FIGURES 1 and 2 will effectively compensate for the change in power dissipation in a load as the result of the change in thermal differential during overload, thus providing a necessary compensating factor.

The device of the instant invention, in addition to being completely comprised of static elements which are energized fully from the current carrying conductor being protected and from no outside source, is further designed so as to provide quick re-cycle time on a trip operation and are in no way effected by the manner in which they are positioned in a circuit breaker due to gravitational forces which are very critical in electromechanical devices of the prior art.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. Inverse time delay means for operating a circuit breaker which protects current carrying conductors comprising current transformer means inductively linked with the current carrying conductor; full-wave rectifying means connected to said current transformer means; series connected zener diode means and resistance means connected across said full-wave rectifying means; capacitor means; normally open semiconductor means connected between said full-wave rectifying means and said zener diode means for connecting said capacitor means to said full-wave rectifying means when the current in said current carrying conductor attains a predetermined level sufficient to close said semiconductor means; trip means comprising a trip coil for energizing a circuit protection device; second normally open semiconductor means coupled between said capacitor and said trip coil for establishing a circuit therethrough when the voltage across said capacitor means achieves a second predetermined level; said capacitor means being selected so that the charge across said capacitor means, when said second predetermined level is achieved, is sufficient to trip the circuit breaker without the need for additional local power sources.

2. The delay means of claim 1 further comprising compensating resistance means connected in parallel with said capacitor means to compensate for the change in power dissipation which results due to the change in thermal differential during an overload condition.

3. The delay means of claim 1 wherein said resistance means is comprised of a Varistor member having an inverse, non-linear voltage-current characteristic.

4. The delay means of claim 2 wherein said Varistor member has an inverse, non-linear voltage-current characteristic represented by the equation $I=KV^n$ where I is the current through the Varistor member
V is the voltage across the Varistor member
K and $n$ are constants.

5. The delay means of claim 1 wherein said resistance means is a non-linear resistance means comprising a plurality of circuit branches connected in parallel across said full-wave rectifying means; each of said circuit branches comprising a series connected zener diode means and a resistance; the firing voltages of the zener diode means in each circuit branch being different from one another to establish a non-linear operation thereof.

6. The delay means of claim 1 wherein said first means is comprised of transistor means having emitter and collector terminals connected between said capacitor means and said full-wave rectifying means and a base terminal connected between said zener diode means and said resistance means.

7. The delay means of claim 5 wherein said second semiconductor means is comprised of transistor means connected between said capacitor means and said trip coil and being controlled by said branch circuit for energizing said trip coil when said second predetermined level is achieved.

8. Inverse time delay means for protecting current carrying conductors comprising current transformer means inductively linked with the current carrying conductor; full-wave rectifying means connected to said current transformer means; series connected zener diode means and resistance means connected across said full-wave rectifying means; capacitor means; first semiconductor means connected to said full-wave rectifying means and said zener diode means for connecting said capacitor means to said full-wave rectifying means when the current in said current carrying conductor attains a predetermined level; trip means comprising a trip coil for energizing a circuit protection device when the voltage across said capacitor means achieves a second predetermined level;

said trip means comprising a branch circuit comprised of series connected second resistance means and second zener diode means; said branch circuit being connected across said capacitor means; silicon controlled rectifier means connected between said capacitor means and said trip coil and being controlled by said branch circuit for energizing said trip coil when said second predetermined level is achieved; said capacitor means being selected so that the charge across said capacitor means, when said second predetermined level is achieved, is sufficient to trip the circuit breaker without the need for additional local power sources.

References Cited

UNITED STATES PATENTS

| | | | |
|---|---|---|---|
| 2,875,382 | 2/1959 | Sandin et al. | 317—36 |
| 3,094,647 | 6/1963 | Ferrin | 317—31 |
| 3,105,920 | 10/1963 | Dewey | 317—31 |
| 3,153,747 | 10/1964 | Sofianek et al. | 317—36 |

MILTON O. HIRSHFIELD, *Primary Examiner.*

R. V. LUPO, *Assistant Examiner.*